United States Patent
Ueno et al.

(10) Patent No.: US 6,758,033 B2
(45) Date of Patent: Jul. 6, 2004

(54) STATE DETERMINING APPARATUS FOR EXHAUST GAS PURIFIER

(75) Inventors: Masaki Ueno, Saitama-ken (JP); Yoshihisa Iwaki, Saitama-ken (JP); Masahiro Sato, Saitama-ken (JP); Tetsuo Endo, Saitama-ken (JP); Shiro Takakura, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/234,710

(22) Filed: Sep. 5, 2002

(65) Prior Publication Data

US 2003/0056496 A1 Mar. 27, 2003

(30) Foreign Application Priority Data

Sep. 7, 2001 (JP) ........................................ 2001-272752
Jul. 24, 2002 (JP) ........................................ 2002-214985

(51) Int. Cl.[7] .............................................. F01N 3/00
(52) U.S. Cl. ............................ 60/277; 60/276; 60/285; 60/297
(58) Field of Search .......................... 60/274, 276, 277, 60/278, 288, 292, 295, 297, 299, 285, 300

(56) References Cited

U.S. PATENT DOCUMENTS 5,595,060 A * 1/1997 Togai et al. ................. 60/274
5,713,198 A   2/1998 Aoki et al.
5,983,628 A * 11/1999 Borroni-Bird et al. ........ 60/274
6,354,076 B1 * 3/2002 Yasui et al. .................. 60/274
6,357,227 B1 * 3/2002 Neufert ........................ 60/309
6,422,006 B2 * 7/2002 Ohmori et al. ............... 60/297

FOREIGN PATENT DOCUMENTS

DE    43 14 043 A1     11/1994
EP    1 132 589 A1      9/2001
JP    05-256124    * 10/1993 ............. F01N/3/08

* cited by examiner

Primary Examiner—Binh Tran
(74) Attorney, Agent, or Firm—Westerman, Hattori, Daniels & Adrian, LLP

(57) ABSTRACT

A state determining apparatus for an exhaust gas purifier is provided for determining the state of the exhaust gas purifier including an adsorbent for adsorbing hydrocarbons; in accordance with the temperature state in the exhaust system of an internal combustion engine. The state determining apparatus is arranged in an exhaust system of the internal combustion engine. The state determining apparatus comprises a humidity sensor for detecting the humidity within a bypass exhaust pipe, and an ECU for determining the temperature state of the exhaust system and determining the state of adsorbent in accordance with the humidity within the bypass exhaust pipe detected by the humidity sensor and the temperature state in the exhaust system detected by the ECU.

13 Claims, 13 Drawing Sheets

F I G. 9
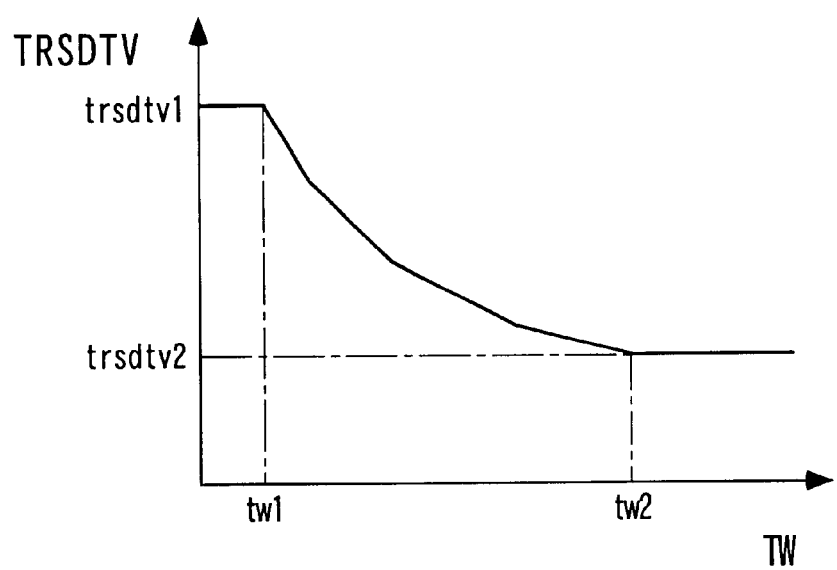

STATE DETERMINING APPARATUS FOR EXHAUST GAS PURIFIER

BACKGROUND OF THE INVENTION

1. Field of the Invention

The present invention relates generally to a state determining apparatus for an exhaust gas purifier which purifies exhaust gases exhausted from an internal combustion engine, and more particularly, to a state determining apparatus for an exhaust gas purifier which purifies exhaust gases by adsorbing hydrocarbons contained in the exhaust gases by an adsorbent.

2. Description of the Prior Art

One type of internal combustion engine is provided with an adsorbent disposed in its exhaust system for adsorbing hydrocarbons in exhaust gases upon starting the engine. The adsorbent has, for example, zeolite on its surface, such that hydrocarbons within exhaust gases enter into pores of the zeolite and are adsorbed by the adsorbent when the hydrocarbons pass through the adsorbent. As the adsorbent is heated to a predetermined temperature or higher (for example, 100–250°C.) by exhaust gases, the adsorbent desorbs once adsorbed hydrocarbons which are recirculated to the internal combustion engine through an EGR pipe and the like. While the adsorption and desorption of hydrocarbons are repeated in the adsorbent in the foregoing manner, a long-term use of the adsorbent may lead to a gradually increasing amount of residual hydrocarbons which could not be desorbed, and broken pores of the adsorbent. As a result, the adsorbent is deteriorated, causing gradually degraded capabilities of adsorbing hydrocarbons in the adsorbent. When the internal combustion engine is started in such a state, hydrocarbons not adsorbed by the adsorbent are emitted to the outside. Thus, a need exists for determining the state of the adsorbent, in particular, a deterioration thereof.

The applicant has proposed a deterioration determining apparatus for determining a deterioration of such an adsorbent, for example, in Laid-open Japanese Patent Application No. 2001-323811. This deterioration determining apparatus takes advantage of a proportional relationship found between the capabilities of the adsorbent to adsorb hydrocarbons and moisture, and detects the humidity of exhaust gases which have passed through the adsorbent by a humidity sensor to determine degraded capabilities of the adsorbent to adsorb hydrocarbons and moisture, i.e., the deterioration of the adsorbent. More specifically, the deterioration determining apparatus sets a predetermined time required for a detected humidity of the humidity sensor to rise by a predetermined value associated with a gradual rise in humidity of exhaust gases which pass through the adsorbent, while moisture in the exhaust gases is adsorbed by the adsorbent, after the start of the engine, in accordance with the humidity at the start and the like, with reference to a normal adsorbent which has not been deteriorated, and measures a time actually taken by the detected humidity to rise by the predetermined value. Then, when the measured time is shorter than the predetermined time, the adsorbent is determined to be deteriorated from the fact that the rising speed of the detected humidity is higher or the detected humidity begins to rise at an earlier timing than when a normal adsorbent is used.

However, the deterioration determining apparatus described above could fail to ensure a sufficient determination accuracy for the deterioration of the adsorbent, because the humidity detected by the humidity sensor rises at a different rising rate or at a different timing depending on a temperature state of the exhaust system at the start of the internal combustion engine.

More specifically, for example, when an internal combustion engine is cold started, heat generated by exhaust gases is taken away by an exhaust system which has substantially the same temperature as the temperature in a starting environment (outside air temperature), so that the temperature of the exhaust gases is lower at a location more downstream of the exhaust system. Then, as the temperature decreases to the dew point (for example, 50–60° C.), moisture in exhaust gases begins condensing and attaches on the inner surface of an exhaust pipe and the like, so that the moisture in exhaust gases decreases more at a location more downstream in the exhaust system. Such condensation occurs more, at an earlier time, and at a more upstream location in the exhaust system as the exhaust system is at a lower temperature upon starting. For this reason, the detected humidity tends to present a lower rising rate because the adsorbent is supplied with exhaust gas with less moisture, i.e., with a lower humidity when the condensation occurs at a location upstream of the adsorbent. This tendency becomes stronger as the exhaust system is at lower temperatures when the internal combustion engine is started.

Also, as described above, the adsorbent desorbs hydrocarbons when it is heated to a predetermined temperature or higher, and tends to have a higher performance of adsorbing hydrocarbons as the temperature is lower at the temperature at which the desorption begins (for example, 50° C.) or lower. This tendency is likewise found in the moisture adsorbing performance as well as in the hydrocarbon adsorbing performance. Therefore, when the combustion engine is cold started, a detected humidity rises at a later timing because a larger amount of moisture in exhaust gases is adsorbed in the adsorbent as the temperature of the adsorbent having substantially the same temperature as the temperature in the exhaust system is lower.

As described above, while the detected humidity rises at a different rate and at a different timing depending on a temperature state of the exhaust system upon start of the internal combustion engine, the aforementioned deterioration determining apparatus merely sets a time elapsed from the start as a parameter for determining a deterioration of the adsorbent, so that it only provides an insufficient accuracy for determining the deterioration, and therefore leaves a room for improvement in this respect.

OBJECT AND SUMMARY OF THE INVENTION

The present invention has been made to solve the problems as mentioned above, and it is an object of the invention to provide a state determining apparatus for an exhaust gas purifier which is capable of accurately determining the state of the exhaust gas purifier, which includes an adsorbent for adsorbing hydrocarbons, including a deterioration of the adsorbent, in accordance with a temperature state of an exhaust system in an internal combustion engine.

To achieve the above object, the present invention provides a state determining apparatus for an exhaust gas purifier arranged in an exhaust system of an internal combustion engine for determining a state of the exhaust gas purifier including an adsorbent capable of adsorbing hydrocarbons and moisture in exhaust gases. The state determining apparatus is characterized by comprising a humidity sensor arranged near the adsorbent in the exhaust system for detecting a humidity in an exhaust pipe of the exhaust system; temperature state detecting means for detecting a temperature state in the exhaust system; and adsorbent state determining means for determining a state of the adsorbent in accordance with the humidity in the exhaust pipe detected by the humidity sensor and the temperature state in the exhaust system detected by the temperature state detecting means.

According to this state determining apparatus for an exhaust gas purifier, the humidity sensor arranged near the adsorbent in the exhaust system detects a humidity in an exhaust pipe of the exhaust system, while the temperature state detecting means detects a temperature state in the exhaust system. Then, the adsorbent state determining means determines the state of the adsorbent in accordance with the results of determinations. Since the abilities of the adsorbent to adsorb hydrocarbons and moisture is in a proportional relationship, the humidity detected by the humidity sensor has a high correlation to actually adsorbed hydrocarbons in the adsorbent. Also, as mentioned above, the humidity detected by the humidity sensor rises at a different rate and at a different timing depending on the temperature state in the exhaust system. Therefore, when the temperature state in the exhaust system is used as a parameter in addition to the humidity within the exhaust pipe for making the state determination, the state of the adsorbent can be accurately determined, including adsorption and desorption of hydrocarbons in the adsorbent, deterioration of the adsorbent, and the like, while reflecting the actual temperature of exhaust gases to the determination result.

Preferably, the state determining apparatus for an exhaust gas purifier further comprises calory calculating means for calculating calory supplied from the internal combustion engine to the exhaust system after the internal combustion engine is started, wherein the adsorbent state determining means further determines the state of the adsorbent further in accordance with the calory calculated by the calory calculating means.

According to this preferred embodiment of the state determining apparatus, the calory calculating means calculates the calory supplied from the internal combustion engine to the exhaust system after the internal combustion engine is started, and the adsorbent state determining means further determines the state of the adsorbent further in accordance with the calory calculated by the calory calculating means. It is therefore possible to more accurately determine the state of the adsorbent while additionally reflecting the states of the exhaust system and a temperature change (rise) of the adsorbent after the start to the determination result. Preferably, the state determining apparatus for an exhaust gas purifier further comprises threshold determining means for determining a threshold based on the temperature state in the exhaust system detected at the time the internal combustion engine is started, wherein the calory calculating means includes accumulated fuel injection amount calculating means for calculating an accumulated fuel amount supplied to the internal combustion engine from a start thereof as the calory, and the adsorbent state determining means determines the state of the adsorbent based on a result of comparison between the accumulated fuel amount from the start of the internal combustion engine and the threshold when a changing amount of the value detected by the humidity sensor after the internal combustion engine is started exceeds a predetermined value set therefor.

According to this preferred embodiment of the state determining apparatus, the state of the adsorbent can be determined at an appropriate timing at which a changing amount of the value detected by the humidity sensor after the start of the internal combustion engine exceeds the predetermined value set therefor, i.e., at which the humidity in the exhaust pipe sufficiently increases (rises) as the adsorption to the adsorbent is gradually saturated. Also, the state of the adsorbent is determined based on the result of a comparison of the accumulated fuel amount supplied to the internal combustion engine from the start to the time at which the humidity in the exhaust pipe sufficiently increases with the threshold determined by the threshold determining means. This threshold reflects the temperature state in the exhaust system at the start of the internal combustion engine, while the accumulated fuel amount indicates the calory given to the exhaust system after the start. Therefore, by determining the state of the adsorbent based on the result of the comparison of the accumulated fuel amount with the threshold, the state of the adsorbent can be more accurately determined while well reflecting actual temperatures of the exhaust system and adsorbent at the time the internal combustion engine is started, and after the start, to the determination result. Also, since the fuel amount is a known control parameter for the internal combustion engine, the calory given to the exhaust system can be readily calculated by simply accumulating the fuel amount from the start of the internal combustion engine.

Preferably, the state determining apparatus for an exhaust gas purifier further comprises ambient temperature detecting means for detecting an ambient temperature around the humidity sensor; and relative humidity calculating means for calculating a relative humidity of exhaust gases from an output of the humidity sensor in accordance with the detected ambient temperature.

According to this preferred embodiment of the state determining apparatus, since the humidity of exhaust gases is calculated from the output of the humidity sensor in accordance with the ambient temperature around the humidity sensor, it is possible to appropriately find the relative humidity compensated for temperature. In addition, the state of the adsorbent can be appropriately determined in accordance with the relative humidity found in this manner.

Preferably, in the state determining apparatus for an exhaust gas purifier, the humidity sensor is arranged at a location downstream of the adsorbent in the exhaust system.

According to this preferred embodiment of the state determining apparatus, since the humidity sensor is arranged at a location downstream of the adsorbent in the exhaust system, the humidity sensor can detect the humidity of exhaust gases which have passed through the adsorbent after the internal combustion engine had been started. Thus, the humidity reflecting an adsorbed state of hydrocarbons in the adsorbent can be detected during the operation of the internal combustion engine, to accurately determine the state of the adsorbent.

Preferably, in the state determining apparatus for an exhaust gas purifier, the adsorbent state determining means determines the state of the adsorbent after a stop of the internal combustion engine.

According to this preferred embodiment of the state determining apparatus, since the state of the adsorbent is determined after the internal combustion engine is stopped, the state of the adsorbent can be determined without the need for monitoring the humidity in the exhaust pipe by the humidity sensor at all times, unlike the state determination for the adsorbent made during the operation of the internal combustion engine. The state of the adsorbent can be determined in this manner for the following reasons. As the internal combustion engine is stopped, the heated adsorbent is gradually cooled down, and accordingly adsorbs surrounding moisture. Then, as the adsorbent incrementally adsorbs the moisture to saturation, the humidity around the adsorbent remains substantially constant, i.e., in the steady-state. The humidity in the steady-state reflects the state of the adsorbent, particularly a deterioration degree. Specifically, a larger deterioration degree of the adsorbent indicates that the adsorbent has a lower moisture adsorbing performance, so that the adsorbent does not adsorb much moisture around it. As the result, the humidity around the adsorbent tends to be higher as compared with that around a normal adsorbent. It is therefore possible to determine the state of the adsorbent by detecting the humidity around the adsorbent after the internal combustion engine is stopped. In addition, since the state determination only requires the detection of the humidity in the exhaust pipe which remains in the steady-state, a humidity sensor is not required to have a high responsibility, so that a reasonable humidity sensor can be used, thereby reducing the cost of the overall apparatus.

Preferably, in the state determining apparatus for an exhaust gas purifier, the adsorbent state determining means determines the state of the adsorbent within a predetermined period after the internal combustion engine is stopped.

According to this preferred embodiment of the state determining apparatus, the state of the adsorbent can be accurately determined by executing the state determination within the predetermined period after the internal combustion engine is stopped, i.e., within a period in which the state determination can be appropriately made for the adsorbent. As described above, when the internal combustion engine is stopped, the adsorbent adsorbs surrounding moisture as the exhaust system is cooled down, bringing the humidity around the adsorbent into the steady-state. When a long time elapses after the internal combustion engine is stopped, the humidity within the exhaust pipe, which has been in the steady-state, gradually converges to the external humidity because the exhaust system is in communication with the outside. Therefore, the state of the adsorbent can be appropriately and accurately determined by executing the state determination while the humidity within the exhaust pipe remains in the steady-state until it begins converging to the external humidity.

Preferably, in the state determining apparatus for an exhaust gas purifier, the humidity sensor is arranged at a location upstream of the adsorbent in the exhaust system.

According to this preferred embodiment of the state determining apparatus, the humidity sensor is spaced from the most downstream end of the exhaust system in communication with the outside by a longer distance than when the humidity sensor is arranged at a location downstream of the adsorbent, so that the humidity sensor can be prevented from being adversely affected by disturbance such as the influence of external air when the internal combustion engine is stopped, for example, a gas exchange between the atmosphere within the exhaust pipe near the humidity sensor and the external air. In this manner, the state determination can be appropriately and accurately made for the adsorbent.

Preferably, the state determining apparatus for an exhaust gas purifier further comprises operating condition detecting means for detecting whether or not the internal combustion engine is operated in a predetermined operating condition before the internal combustion engine is stopped, wherein the adsorbent state determining means determines the state of the adsorbent when the operating condition detecting means detects that the internal combustion engine is operated in the predetermined operating condition before the internal combustion engine is stopped.

According to this preferred embodiment of the state determining apparatus, the state determination is made for the adsorbent when the internal combustion engine is operated in the predetermined operating condition before the internal combustion engine is stopped. Generally, the amount of moisture contained in exhaust gases depends on the operating condition of the internal combustion engine. Therefore, the state of the adsorbent can be accurately determined after the internal combustion engine is stopped by defining the predetermined operating condition as an operating condition in which exhaust gases contain an amount of moisture suitable for determining the state of the adsorbent.

Preferably, in the state determining apparatus for an exhaust gas purifier, the predetermined operating condition of the internal combustion engine is a condition in which an air/fuel mixture supplied to the internal combustion engine is at an air/fuel ratio near the stoichiometric air/fuel ratio during the operation of the internal combustion engine.

According to this preferred embodiment of the state determining apparatus, the deterioration determination is made for the adsorbent after the internal combustion engine is stopped during an operation near the stoichiometric air/fuel ratio. When the internal combustion engine is operated near the stoichiometric air/fuel ratio, exhaust gases contain a relatively large amount of moisture without large variations, so that the ambient humidity around the humidity sensor after the engine is stopped is also relatively high without large variations, suitable for making the deterioration determination for the adsorbent. Thus, the deterioration determination made in such a condition can provide a more accurate determination as to whether the adsorbent is deteriorated.

Preferably, in the state determining apparatus for an exhaust gas purifier, the temperature state of the exhaust system is a temperature of a cooling water upon start of the internal combustion engine.

According to this preferred embodiment of the state determining apparatus, the temperature of cooling water in the internal combustion engine upon starting can be properly used as a parameter indicative of the temperature state in the exhaust system. Also, since the internal combustion engine is typically provided with a water temperature sensor for detecting the temperature of cooling water, the existing water temperature sensor may be used for detecting the operating condition, thereby realizing the temperature state detecting means at a low cost.

Preferably, in the state determining apparatus for an exhaust gas purifier, the adsorbent state determining means includes adsorbent deterioration determining means for determining a deterioration of the adsorbent as the state of the adsorbent.

As described above, a deteriorated adsorbent suffers from lower abilities to adsorb moisture as well as hydrocarbons, so that the adsorbent can be determined in regard to deterioration by detecting the humidity around the adsorbent. Therefore, according to the preferred embodiment of the state determining apparatus, a deterioration of the adsorbent can be accurately determined by the state determining technique of the present invention so far described, while satisfactorily reflecting the temperature state in the exhaust system of the internal combustion engine to the result of determination.

Preferably, in the state determining apparatus for an exhaust gas purifier, the adsorbent comprises zeolite.

According to this preferred embodiment of the state determining apparatus, the zeolite adsorbs moisture as well as hydrocarbons, and there is a high correlation between the abilities of the zeolite to adsorb both components, so that the advantages and effects so far described can be well provided by applying the present invention. The zeolite can implement an adsorbent which excels in heat resistance and is less susceptible to deterioration, as compared with, for example, silica gel, active carbons or the like when they are used as the adsorbent.

BRIEF DESCRIPTION OF THE DRAWINGS

FIG. 9 is a deterioration determining threshold table showing the relationship between an engine water temperature TW at the start of the engine and an adsorbent deterioration determining threshold TRSDTV;

DETAILED DESCRIPTION OF THE EMBODIMENT

Figure 1:
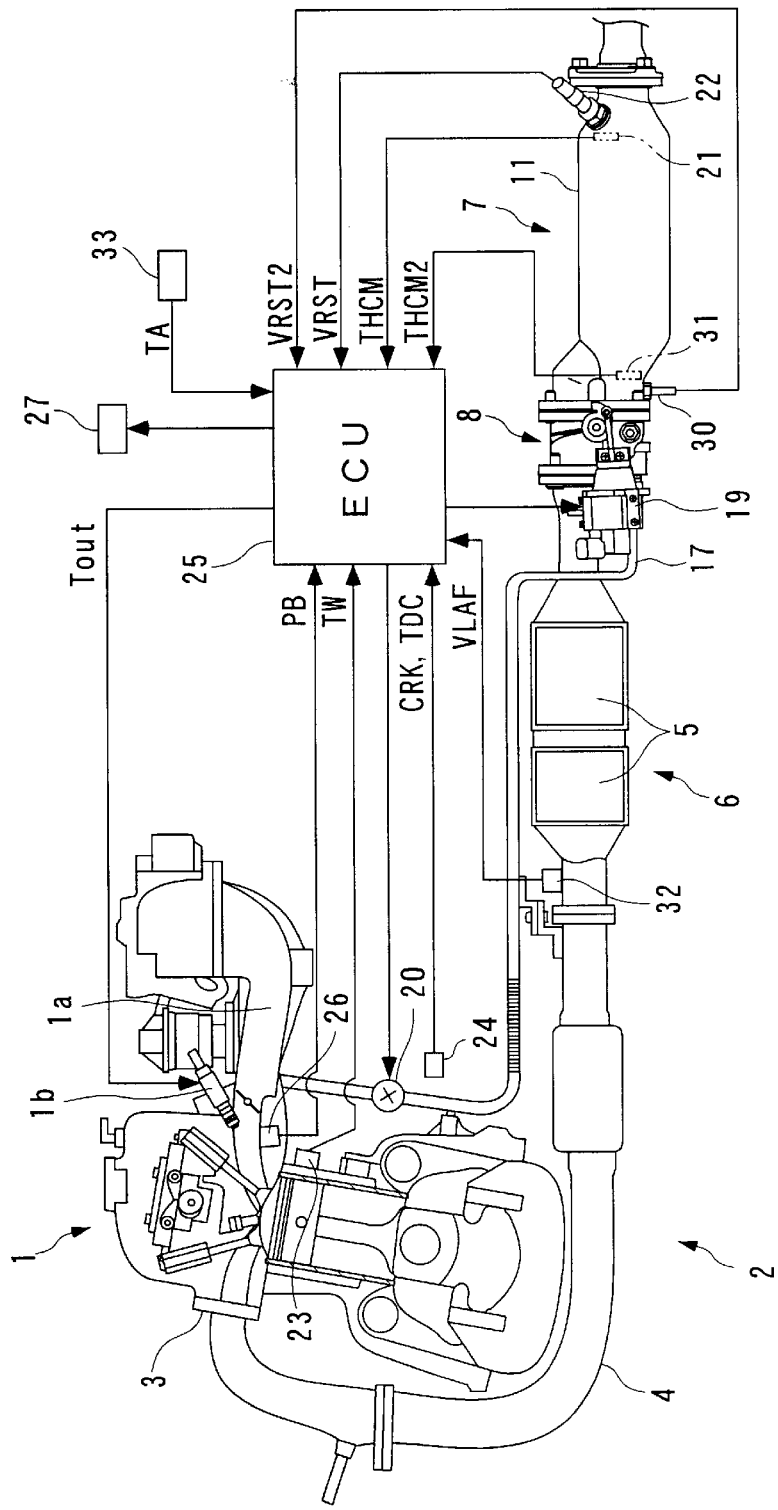
FIG. 1 is a diagram generally illustrating an internal combustion engine in which a state determining apparatus for an exhaust gas purifier is applied according to a first embodiment of the present invention.

In the following, a preferred embodiment of the present invention will be described in detail with reference to the accompanying drawings. FIG. 1 illustrates an internal combustion engine in which a state determining apparatus for an exhaust gas purifier is applied according to a first embodiment of the present invention. An exhaust system 2 of the engine 1 has an exhaust pipe 4 connected to the engine 1 through an exhaust manifold 3. A catalyzer 6 having two three-way catalysts 5, and a hydrocarbon adsorber 7 for adsorbing hydrocarbons are provided halfway in the exhaust pipe 4 as an exhaust gas purifier for purifying exhaust gases. The two three-way catalysts 5 of the catalyzer 6 are arranged adjacent to each other along the exhaust pipe 4, and purify harmful substances (hydrocarbons (HC), carbon monoxide (CO) and nitrogen oxides (NOx)) in exhaust gases passing through the catalyzer 6 by oxidation-reduction catalyst actions, when they are heated to a predetermined temperature (for example, 300° C.) or higher and activated.

Figure 2:
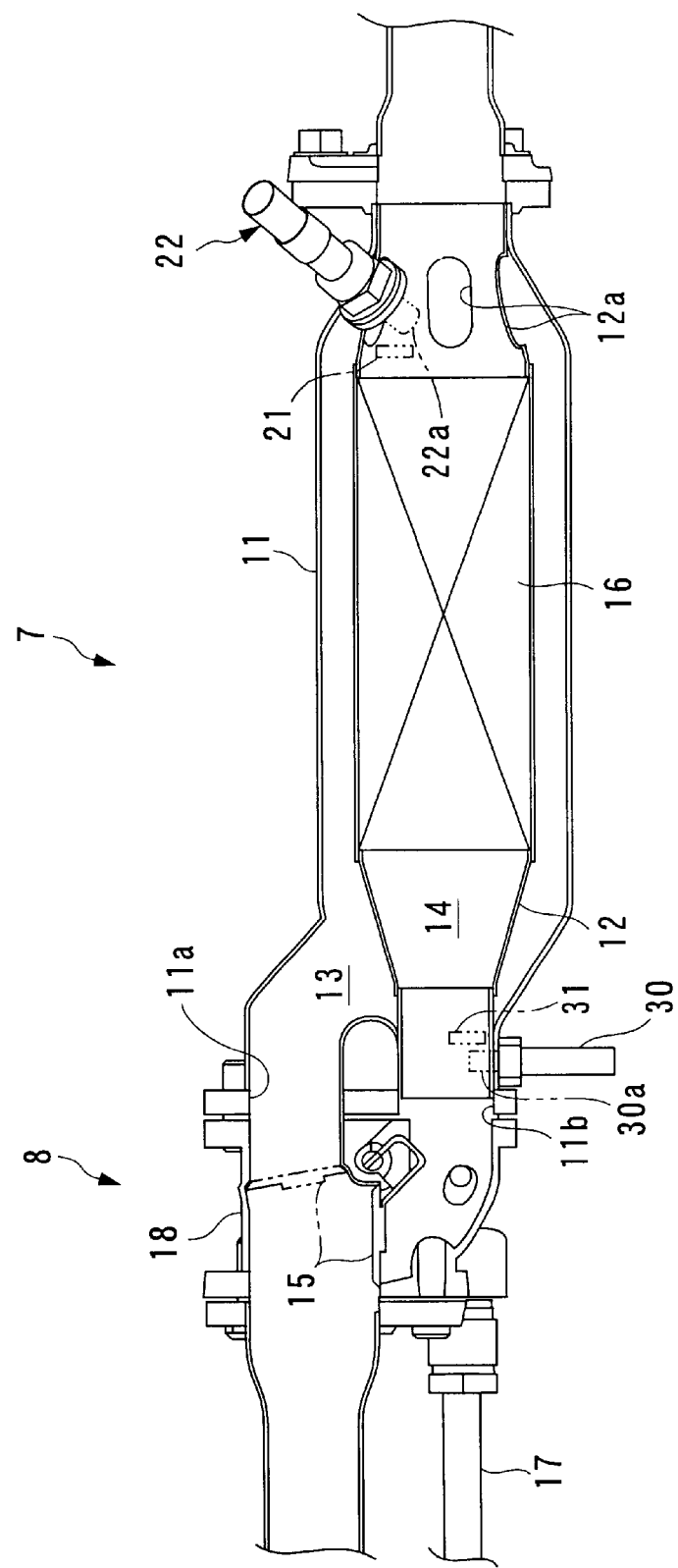
FIG. 2 is an enlarged cross-sectional view illustrating a hydrocarbon adsorbing device.

The hydrocarbon adsorber 7 in turn is arranged at a location downstream of the catalyst 6 in the exhaust pipe 4, and provided for reducing the amount of hydrocarbons emitted to the atmosphere by adsorbing hydrocarbons in exhaust gases during a starting period (for example, for approximately 30 to 40 seconds from the start) of the engine 1 in a cold state in which the three-way catalysts 5 have not been activated. As illustrated in FIGS. 1 and 2, the hydrocarbon adsorber 7 is coupled to an downstream end of the catalyzer 6 through an exhaust passage switch 8. The hydrocarbon adsorber 7 comprises a substantially cylindrical case 11; a bypass exhaust pipe 12 arranged within the case 11; and a cylindrical adsorbent 16 arranged halfway in the bypass exhaust pipe 12 for adsorbing hydrocarbons in exhaust gases which are introduced into the bypass exhaust pipe 12.

As illustrated in FIG. 2, the case 11 has its upstream end divided into two, i.e., an upper and a lower opening 11a, 11b. The upper opening 11a is in communication with a main passage 13 having an annular cross section and formed between the case 11 and bypass exhaust pipe 12, while the lower opening 11b is in communication with a bypass passage 14 which is an inner space of the bypass exhaust pipe 12.

The bypass exhaust pipe 12 has its upstream end connected to an inner surface of the lower opening 11b of the case 11, and a downstream end connected to an inner surface of a downstream end of the case 11, respectively, in an air tight state. The bypass exhaust pipe 12 is formed with a plurality (for example, five) of elongated communication holes 12a in a downstream end portion in the circumferential direction at equal intervals, such that the downstream end of the main passage 13 is in communication with the downstream end of the bypass passage 14 through these communication holes 12a.

The adsorbent 16 is comprised of a honeycomb core (not shown), made of a metal, which carries zeolite on its surface, and has the property of adsorbing moisture as well as hydrocarbons. As exhaust gases introduced into the bypass passage 14 pass through the adsorbent 16, hydrocarbons and moisture in the exhaust gases are adsorbed by the zeolite. The zeolite, which has high heat resistant properties, adsorbs hydrocarbons at low temperatures (for example, below 100° C.), and desorbs hydrocarbons once adsorbed thereby at a predetermined temperature or higher (for example, 100–250° C.). Then, the desorbed hydrocarbons are recirculated to the engine 1 from the hydrocarbon adsorber 7 through an EGR pipe 17 and an intake pipe 1a, and burnt by the engine 1.

The exhaust passage switch 8 is provided for selectively switching the passage of exhaust gasses downstream of the catalyzer 6 to the main passage 13 or bypass passage 14 in accordance with an activated state of the three-way catalysts 5. The exhaust passage switch 8 comprises a substantially cylinder coupling pipe 18; and a pivotable switching valve 15 arranged in the coupling pipe 18. The switching valve 15 is driven by a switching valve driver 19 (see FIG. 1) which is controlled by an ECU 25, later described, for switching the exhaust gas passage to the main passage 13 when it is present at a position indicated by solid lines in FIG. 2 and for switching the exhaust gas passage to the bypass passage 14 when it is present at a position indicated by two-dot chain lines.

As described above, the EGR pipe 17 is coupled between the coupling pipe 18 and the intake pipe 1a of the engine 1 for recirculating a portion of exhaust gases to the engine 1, and an EGR control valve 20 is arranged halfway in the EGR pipe 17. The EGR control valve 20 is controlled by the ECU 25 to actuate and stop the EGR and control an EGR amount.

In the foregoing configuration, the exhaust gas passage is switched to the bypass passage 14 by the exhaust passage switch 8 immediately after a cold start of the engine 1, thereby leading exhaust gasses passing through the catalyzer 6 to the bypass passage 14. The exhaust gases are emitted to the atmosphere after hydrocarbons in the exhaust gases have been adsorbed by the adsorbent 16. Subsequently, as it is determined that hydrocarbons have been adsorbed by adsorbent 16, the exhaust gas passage is switched to the main passage 13 to lead the exhaust gases to the main passage 13 through the coupling pipe 18 for emission to the atmosphere. Also, as the EGR control valve 20 is opened to operate the EGR, a portion of the exhaust gases is recirculated to the intake pipe 1a through the bypass passage 14 and EGR pipe 17 as an EGR gas. Hydrocarbons desorbed from the adsorbent 16 are sent to the intake pipe 1a by the EGR gas and burnt by the engine 1.

A downstream humidity sensor 22 is attached to the case 11 of the hydrocarbon adsorber 7 at a location downstream of the adsorbent 16 to face the bypass passage 14. The downstream humidity sensor 22 is used to determine the state, mainly a deterioration, of the adsorbent 16 during an operation of the engine 1. The downstream humidity sensor 22 includes a sensor element 22a (see FIG. 2) comprised of a porous body, for example, made of alumina, titania or the like, and detects the humidity, taking advantage of the characteristic that its resistance value varies in accordance with the amount of moisture adsorbed into pores of the sensor element 22a. The downstream humidity sensor 22 sends a detection signal indicative of a resistance value VRST of the sensor element 22a to the ECU 25. An ambient temperature sensor 21 (ambient temperature detecting means) comprised of a thermistor or the like is additionally arranged near the sensor element 22a to detect an ambient temperature THCM near the sensor element 22a and send a detection signal indicative of the ambient temperature THCM to the ECU 25.

An upstream humidity sensor 30 is also attached to the case 11 of the hydrocarbon adsorber 7 at a location upstream of the adsorbent 16 to face the bypass passage 14 for determining the state of the adsorbent 16 during an inoperative state of the engine 1. The upstream humidity sensor 30, which is similar to the downstream humidity sensor 22, sends a detection signal indicative of a resistance value VRST2 of a sensor element 30a to the ECU 25. An ambient temperature sensor 31 (ambient temperature detecting means) is also arranged near the sensor element 30a to detect an ambient temperature THCM2 near the sensor element 30a and send a detection signal indicative of the ambient temperature THCM2 to the ECU 25.

A proportional air/fuel ratio sensor (hereinafter called the "LAF sensor") 32 is further arranged at a location upstream of the catalyzer 6 in the exhaust pipe 4. The LAF sensor 32 linearly detects the concentration of oxygen in exhaust gases (air/fuel ratio) and outputs the detected air/fuel ratio, i.e., a detection value VLAF to the ECU 25. The detection value VLAF of the LAF sensor 32 is set lower as the concentration of oxygen is lower, i.e., air-fuel ratio is richer.

An engine water temperature sensor 23 (temperature state detecting means) comprising a thermistor or the like, and a crank angle sensor 24 are attached to the body of the engine 1. The engine water temperature sensor 23 detects an engine water temperature TW, which is the temperature of cooling water circulating within a cylinder block of the engine 1, and sends a detection signal indicative of the engine water temperature TW to the ECU 25. The crank angle sensor 24, on the other hand, outputs a CRK signal and a TDC signal, which are pulse signals, to the ECU 25 every predetermined crank angle as a crack shaft, not shown, of the engine 1 is rotated. An intake pressure sensor 26 is attached to the intake pipe 1a for detecting an absolute pressure PB within the intake pipe 1a and sending a detection signal indicative of the absolute pressure PB to the ECU 25. An alarm lamp 27 is further connected to ECU 25 for generating an alarm by lighting when it is determined that the absorbent 16 is deteriorated. The ECU 25 is also supplied with a detection signal from an ambient temperature sensor 33 indicative of an ambient temperature TA as a temperature external to the engine 1 and exhaust pipe 4.

In this embodiment, the ECU 25 functions as an adsorbent state determining means, a calory calculating means, a threshold determining means, an accumulated fuel amount calculating means, a relative humidity calculating means, and an adsorbent deterioration determining means. The ECU 25 is based on a microcomputer which comprises an I/O interface, a CPU, a RAM, a ROM and the like. The detection signals from the aforementioned sensors such as the downstream humidity sensor 22 are inputted to the CPU after they are A/D converted and reshaped in the I/O interface. The CPU controls a fuel injection time Tout for an injector 1b corresponding to each of a plurality of cylinders of the engine 1, the switching valve driver 19, and the EGR control valve 20 in accordance with a control program, tables and the like stored in the ROM in response to the foregoing detection signals, and determines the state, i.e., a deterioration of the adsorbent 16.

Figure 3:
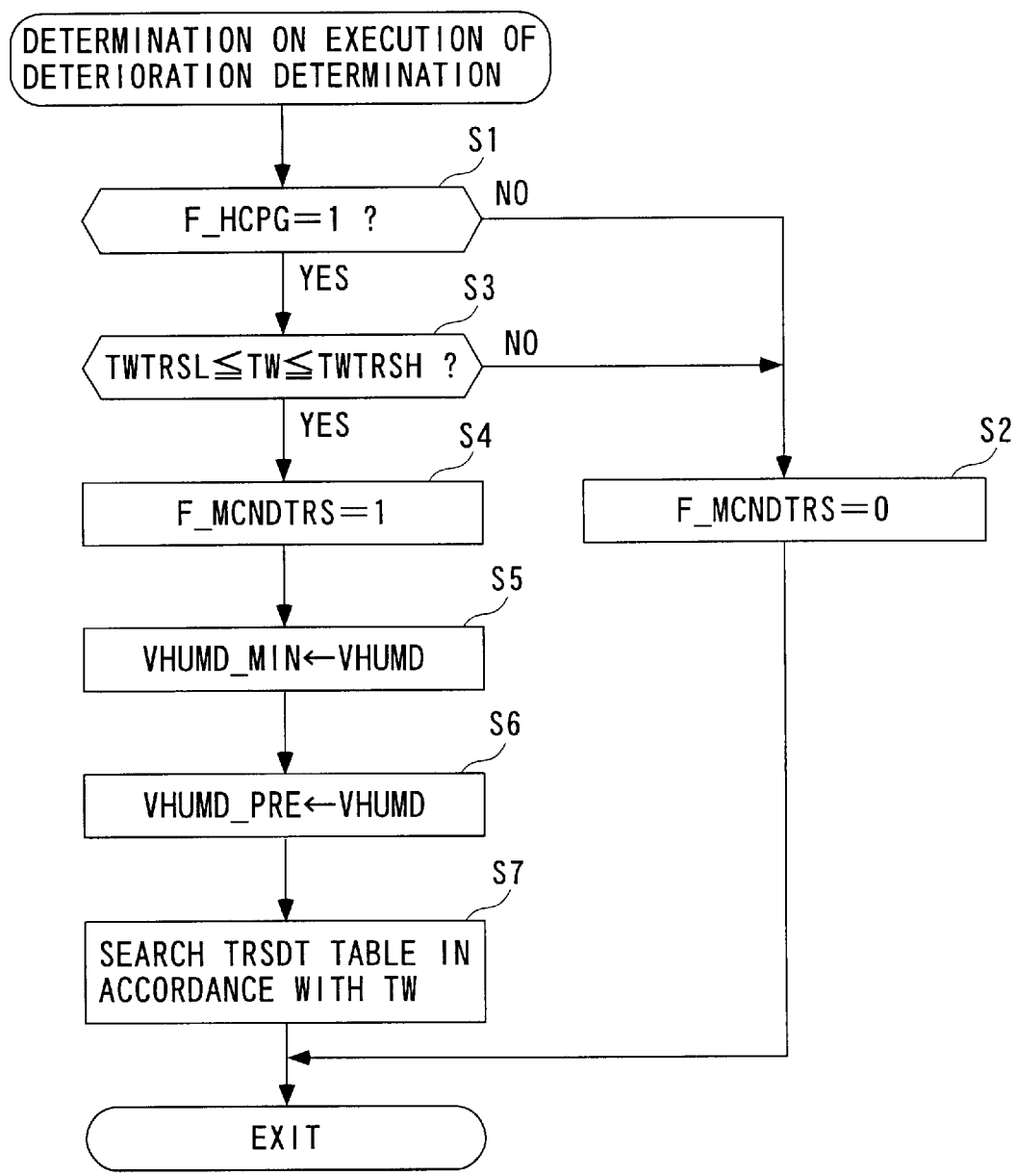
FIG. 3 is a flow chart illustrating a routine for determining whether or not a deterioration determination is executed for an adsorbent.

Next, processing for determining a deterioration of the adsorbent 16 will be described with reference to FIGS. 3 to 7. FIG. 3 illustrates a routine for determining whether or not a deterioration determination is executed for the adsorbent 16. This routine is executed only once immediately after the engine 1 is started.

First, in this routine, it is determined at step 1 (labeled as "S1" in the figure. The same applies to the following description) whether or not a desorption completion flag F_HCPG is "1" which indicates that hydrocarbons have been completely desorbed from the adsorbent 16 during the preceding operation. If the result of determination at step 1 is NO, i.e., when hydrocarbons have not been desorbed during the preceding operation, the ECU 25 sets a deterioration determination enable flag F_MCNDTRS to "0" (step 2), on the assumption that conditions are not established for executing a routine for determining the deterioration of the adsorbent 16 because the hydrocarbons remaining in the adsorbent 16 prevents a proper determination on the deterioration of the adsorbent 16, followed by termination of the routine.

On the other hand, if the result of determination at step 1 is YES, indicating that hydrocarbons have been desorbed during the preceding operation, the routine proceeds to step 3, wherein it is determined whether or not the engine water temperature TW is equal to or higher than its lower limit value TWTRSL (for example, 0° C.) and equal to or lower than its upper limit value TWTRSH (for example, 50° C.). If the result of determination at step 3 is NO, i.e., when the engine water temperature TW at the start of the engine 1 is out of a predetermined range defined by the upper and lower limit values TWTRSL/TWTRSH, the ECU 25 sets the deterioration determination enable flag F_MCNDTRS to "0" (step 2) on the assumption that the conditions are not established for executing the routine for determining the deterioration of the adsorbent 16, as is the case with the incomplete desorption of hydrocarbons, followed by termination of the routine.

On the other hand, if the result of determination at step 3 is YES, indicating that the engine water temperature TW is within the predetermined range, the ECU 25 sets the deterioration determination enable flag F_MCNDTRS to "1" (step 4), on the assumption that the conditions are established for executing the routine for determining the deterioration of the adsorbent 16. Next, the relative humidity VHUMD detected by the downstream humidity sensor 22 at that time is set as an initial value for a minimum value VHUMD_MIN (step 5) and a preceding value VHUMD_PRE (step 6), respectively, of the relative humidity VHUMD. The relative humidity VHUMD is calculated from a table shown in FIG. 4 in accordance with a sensor resistance value VRST detected by the downstream humidity sensor 22.

Figure 4:
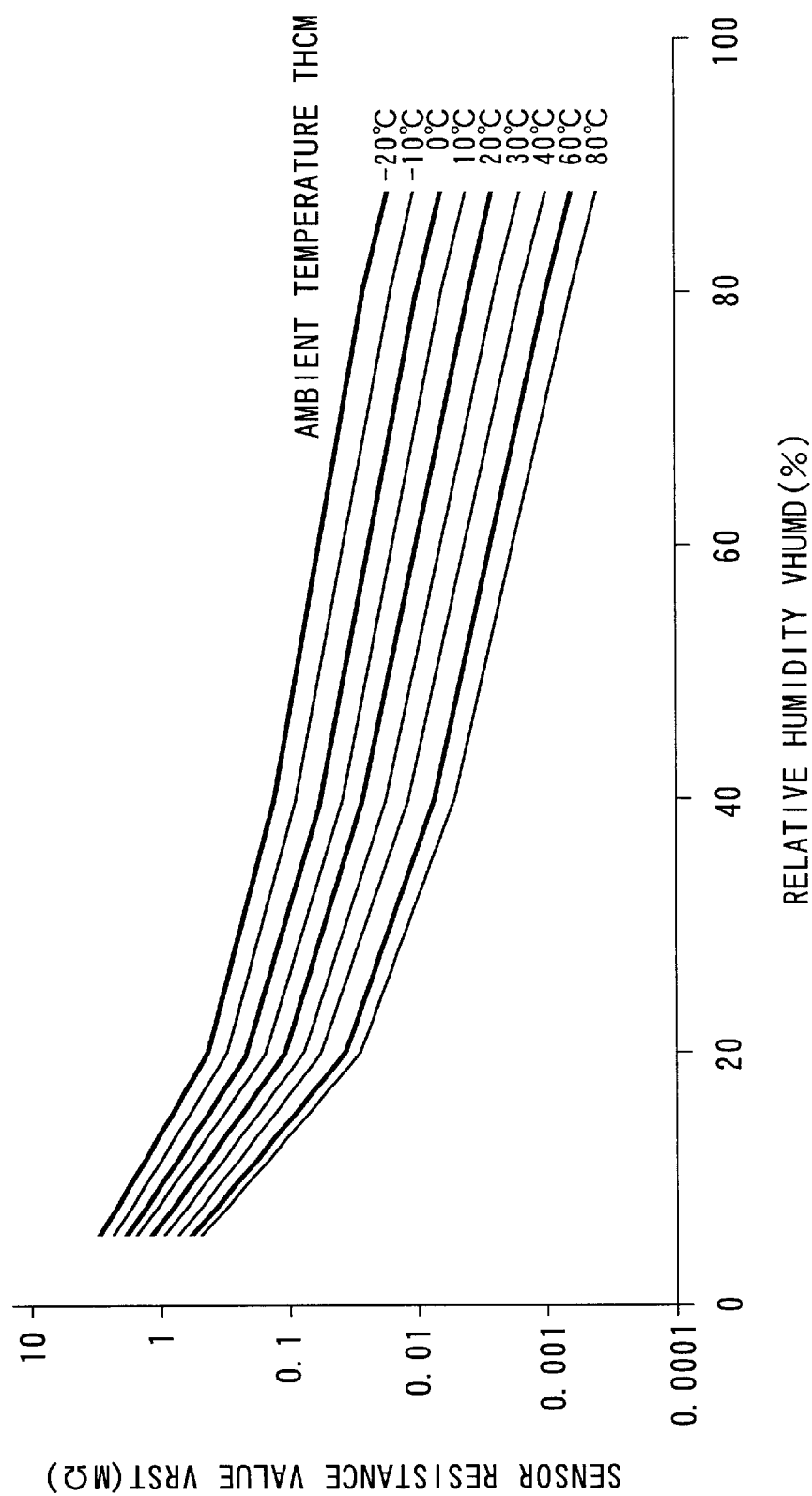
FIG. 4 shows a table for calculating a relative humidity VHUMD in accordance with an ambient temperature THCM and a sensor resistance value VRST.

The table shown in FIG. 4 is made up of nine tables corresponding to the ambient temperature THCM, and each table is set in such a manner that the relative humidity VHUMD is lower as the sensor resistance value VRST is higher. Also, among tables, the relative humidity VHUMD is higher as the ambient temperature THCM is lower. One table corresponding to the ambient temperature THCM detected by the ambient temperature sensor 21 is selected from among these tables, and a table corresponding to the sensor resistance value VRST detected by the downstream humidity sensor 22 is searched to calculate the relative humidity VHUMD. When the ambient temperature THCM presents a value between tables, the relative humidity VHUMD is calculated by an interpolation. By finding the relative humidity VHUMD in this manner, the relative humidity VHUMD can be appropriately calculated for exhaust gases which are compensated for the temperature.

Figure 5:
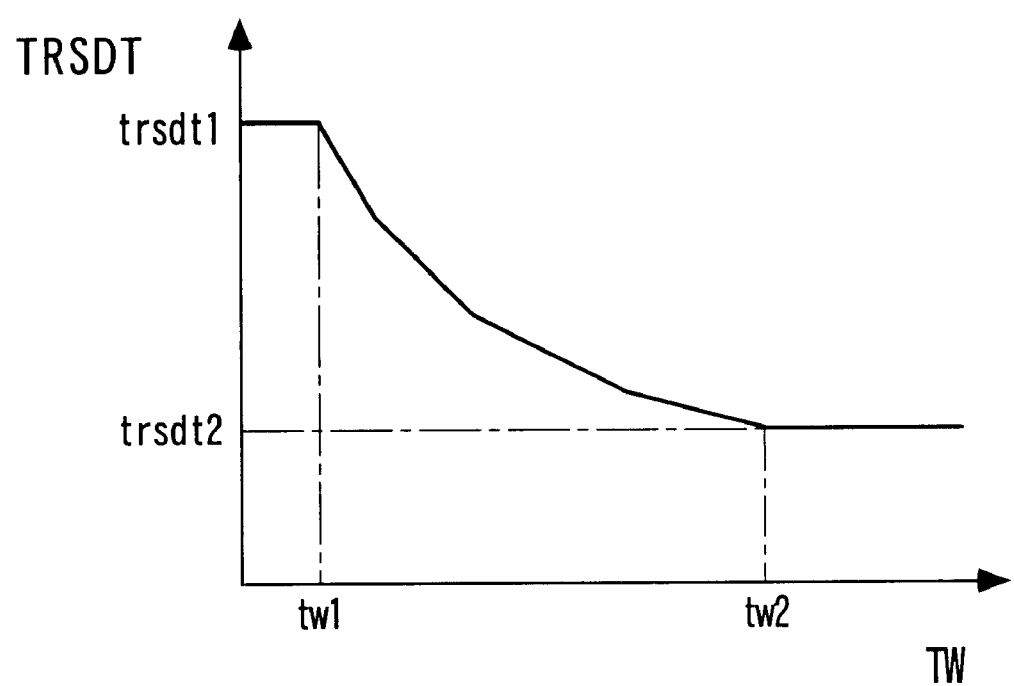
FIG. 5 is a deterioration determining threshold table showing the relationship between an engine water temperature TW at the start of the engine and an adsorbent deterioration determining threshold TRSDT.

Next, the routine proceeds to step 7, where a deterioration determination threshold table (hereinafter referred to as the "TRSDT table") for the adsorbent 16 shown in FIG. 5 is searched in accordance with the engine water temperature TW to calculate a deterioration determination threshold TRSDT (threshold) for determining the deterioration of the adsorbent 16, later described, followed by termination of the routine.

As shown in FIG. 5, in the TRSDT table, the deterioration determination threshold TRSDT is set at a first predetermined value trsdt1 when the engine water temperature TW is below a first predetermined temperature tw1 (for example, 0° C.), and at a second predetermined value trsdt2 (trsdt1>trsdt2) when the engine water temperature TW exceeds a second predetermined temperature tw2 (for example 40° C.) higher than the first predetermined temperature tw1. Also, when the engine water temperature TW is between the two predetermined temperatures tw1, tw2 (tw1≦TW≦tw2), the deterioration determination threshold TRSDT is set at a larger value as the engine water temperature TW is lower.

Figure 6:
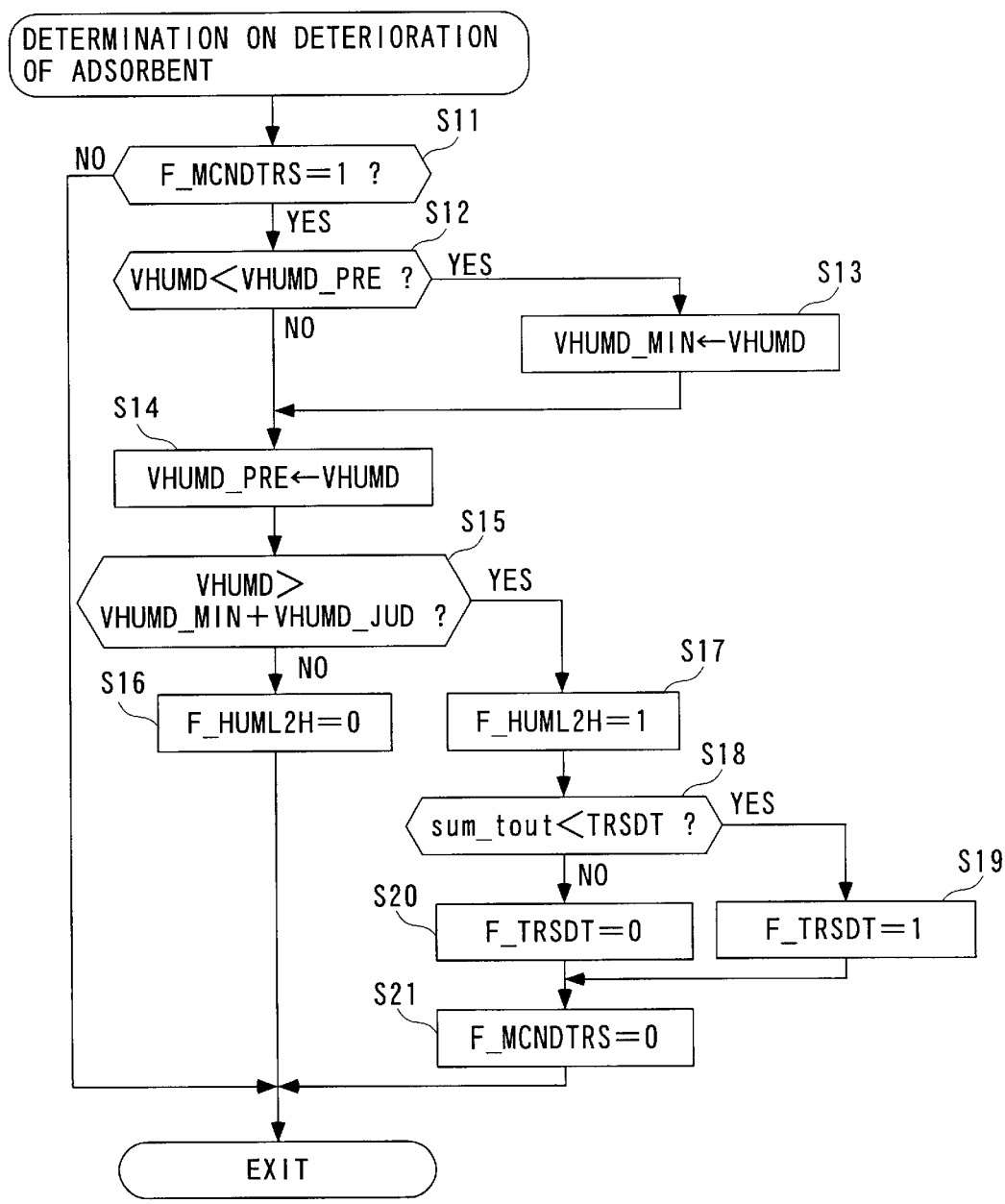
FIG. 6 is a flow chart illustrating a routine for determining the deterioration of the adsorbent based on a relative humidity VHUMD.
Figure 7:
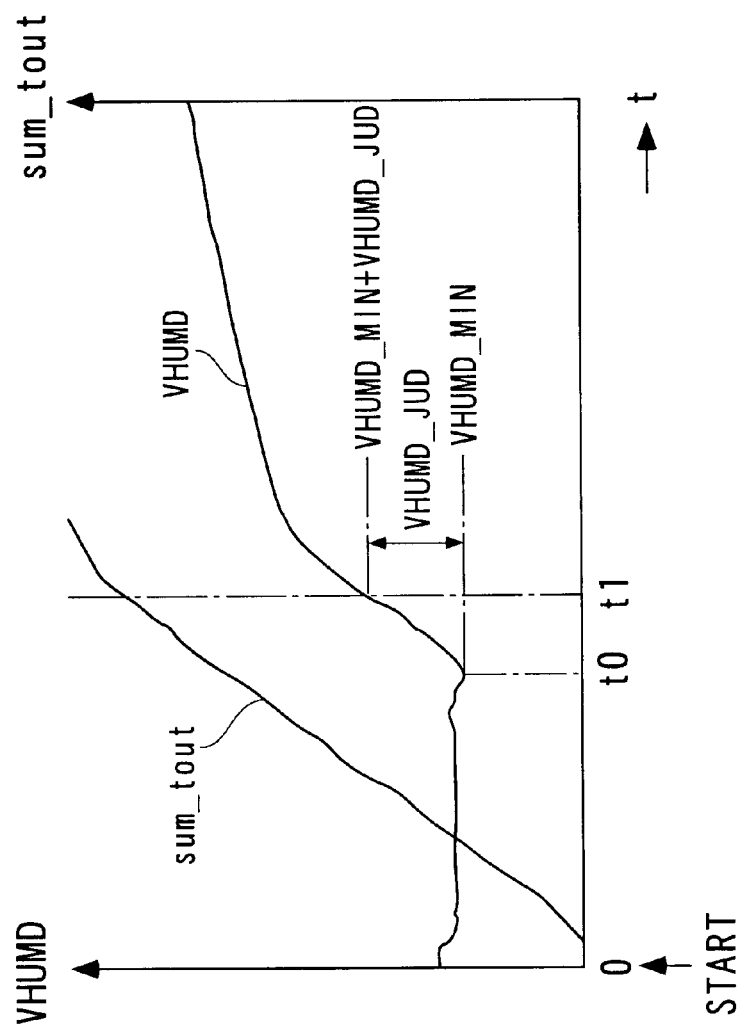
FIG. 7 is a time chart showing an exemplary transition of a relative humidity VHUMD detected by a downstream humidity sensor and accumulated fuel injection amount sum_tout from the start of the engine.

FIG. 6 illustrates a routine for determining the deterioration of the adsorbent 16, executed in accordance with the result of determination made by the routine in the aforementioned FIG. 3. This routine is executed every predetermined time (for example, every 100 ms). First, it is determined whether or not the deterioration determination enable flag F_MCNDTRS is "1" (step 11). If the result of determination at step 11 is NO, showing that the conditions are not established for executing a routine for determining the deterioration of the adsorbent 16, the routine is terminated without further processing.

On the other hand, if the result of determination at step 11 is YES, showing that the conditions are established for executing a routine for determining the deterioration of the adsorbent 16, it is determined whether or not the relative humidity VHUMD calculated from a current detection value provided by the downstream humidity sensor 22 is smaller than the preceding value VHUMD_PRE (step 12). If the result of determination at step 12 is YES, i.e., VHUMD<VHUMD_PRE, the ECU 25 sets the relative humidity VHUMD at that time as a minimum value VHUMD_MIN (step 13). In this manner, the minimum value VHUMD_MIN is updated at all times when the relative humidity VHUMD is lower than the preceding value thereof, so that the minimum value VHUMD_MIN indicates a minimum value immediately before the relative humidity VHUMD begins rising (see time t0 in FIG. 7). If the result of determination at step 12 is NO, or after executing step 13, the routine proceeds to step 14, where the ECU 25 shifts the current relative humidity VHUMD to the preceding value VHUMD_PRE.

Next, it is determined whether or not the relative humidity VHUMD is larger than the sum of the minimum value VHUMD_MIN and a predetermined rising determination value VHUMD_JUD (for example, 10%) (step 15). If the result of determination at step 15 is NO, the ECU 25 sets a rising establishment flag F_HUML2H to "0" (step 16), on the assumption that the relative humidity VHUMD has not sufficiently risen, followed by termination of the routine.

On the other hand, if the result of determination at step 15 is YES, showing that VHUMD>VHUMD_MIN+VHUMD_JUD is established, i.e., when the relative humidity VHUMD rises from the minimum value VHUMD_MIN beyond the rising determination value VHUMD_JUD (at time t1 in FIG. 10), the ECU 25 sets the rising establishment flag F_HUML2H to "1" (step 17), on the assumption that the relative humidity VHUMD has sufficiently risen and is now stably rising.

Next, the routine proceeds to step 18, where it is determined whether or not an accumulated fuel injection amount sum_tout (accumulated fuel amount) is smaller than the deterioration determination threshold TRSDT calculated at the aforementioned step 7 in FIG. 3. This accumulated fuel injection amount sum_tout indicates an aggregate of the fuel injection time Tout of the injector 1b in each cylinder from the start of the engine 1, and indicates the calory given by the engine 1 to the exhaust system 2 from the start thereof. Therefore, a larger accumulated fuel injection amount sum_tout indicates larger calory given to the adsorbent 16. On the other hand, the adsorbent 16 tends to have a high adsorbing performance at low temperatures and present a lower adsorbing performance as the temperature rises. The relative humidity VHUMD rises when the temperature rises to some degree. Therefore, if the determination result at step 18 is YES, i.e., when sum_tout<TRSDT, the ECU 25 determines that the adsorbent 16 is deteriorated on the assumption that the relative humidity VHUND has risen earlier though the adsorbent 16 is not given sufficient calory to cause the relative humidity VHUMD to rise, and sets a deterioration flag F_TRSDT to "1" (step 19) to indicate that the adsorbent 16 is deteriorated.

On the other hand, if the determination result at step 18 is NO, i.e., when sum_toutTRSDT, the ECU 25 determines that the adsorbent 16 is not deteriorated on the assumption that the relative humidity VHUMD rises just after the adsorbent 16 is given sufficient calory, and sets the deterioration flag F_TRSDT to "0" (step 20).

At step 21 subsequent to step 19 or 20, the ECU 25 sets a deterioration determination enable flag F_MCNDTRS to "0" in response to the termination of the deterioration determination for the adsorbent 16, followed by termination of the routine.

As described above in detail, according to the foregoing embodiment, the rising determination value VHUMD_JUD is used to determine whether or not the relative humidity VHUMD downstream of the adsorbent 16 has risen after the start of the engine 1, and the accumulated fuel injection amount sum_tout from the start to the rise, i.e., the calory given to the adsorbent 16 is compared with the deterioration determination threshold value TRSDT to determine a deterioration of the adsorbent 16, so that the deterioration determination can be accurately made in accordance with a temperature state of the exhaust system at the start and after the start of the engine 1. Also, as described before in connection with FIG. 5, the deterioration determination threshold value TRSDT is set larger as the engine water temperature TW at the start is lower. In other words, the deterioration determination threshold value TRSDT is set larger as larger calory is required to increase the temperature of the adsorbent 16, so that the deterioration determination for the adsorbent 16 can be more appropriately made by the determination through the comparison at step 18 in FIG. 6.

Next, a second embodiment will be described with reference to FIGS. 8 to 11. Unlike the first embodiment, the second embodiment uses the sensor resistance value VRST, which is the detection value of the downstream humidity sensor 22, without converting it to the relative humidity HVUMD. The sensor resistance value VRST presents a higher value as the humidity of exhaust gases is lower. In other words, the sensor resistance value VRST presents completely reverse behaviors to the relative humidity VHUMD in the first embodiment in terms of the magnitude and increase/decrease. Specifically, the relative humidity VHUMD rises after the start of the engine 1 as described above, whereas the sensor resistance value VRST falls as described later (see FIG. 11). In the following description, those parts of processing similar to the first embodiment will be described in brief.

Figure 8:
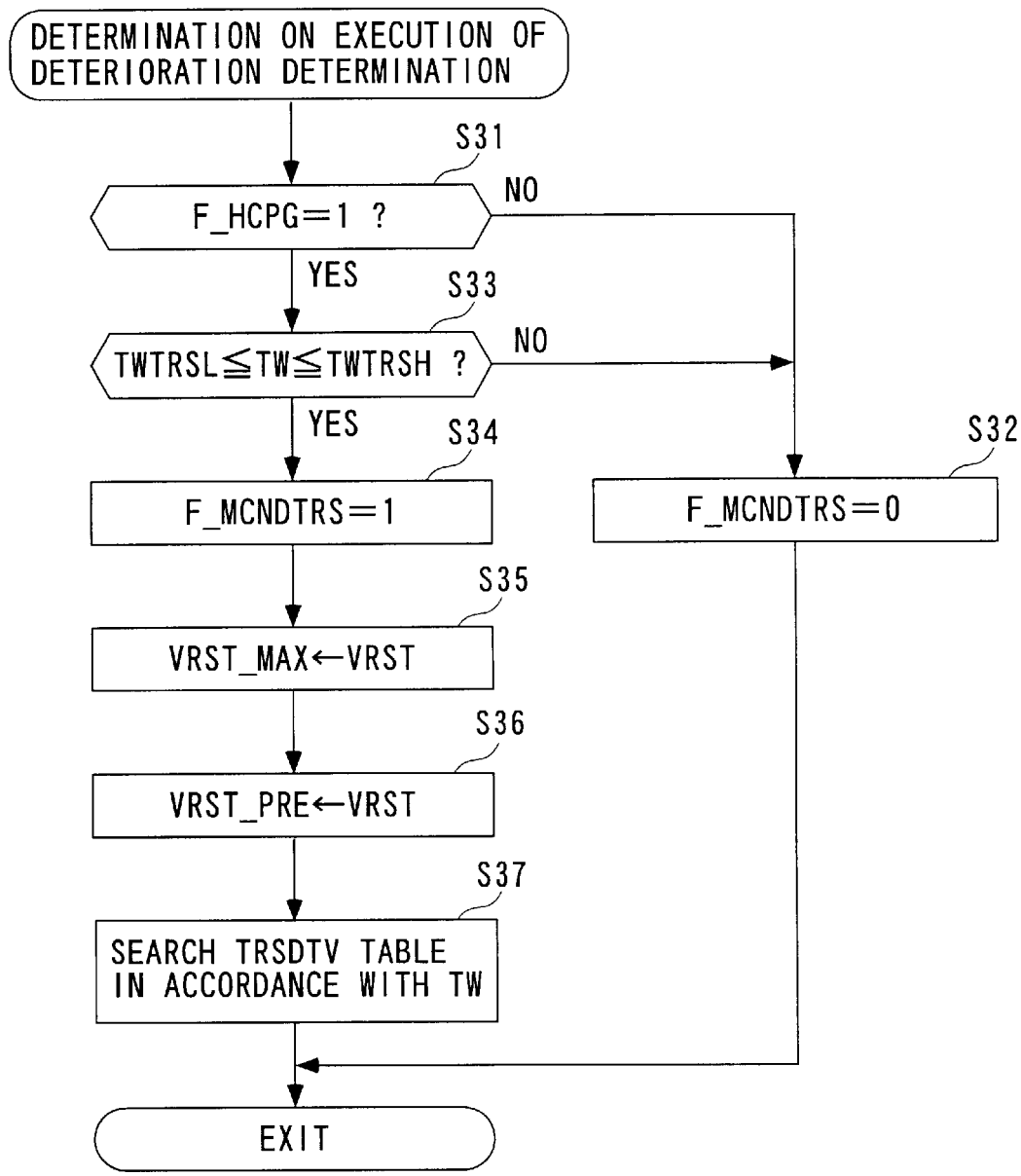
FIG. 8 is a flow chart illustrating a routine for determining whether or not a deterioration determination is executed for an adsorbent in a second embodiment.

FIG. 8 illustrates a routine for determining whether or not the deterioration determination is executed, corresponding to the routine illustrated in FIG. 3 in the first embodiment. As illustrated in FIG. 8, in this routine, it is first determined whether or not a desorption completion flag F_HCPG is "1" (step 31). If the result of determination at step 31 is NO, the ECU 25 sets a deterioration determination enable flag F_MCNDTRS to "0" (step 32), on the assumption that hydrocarbons have not been desorbed during the preceding operation, so that conditions are not established for executing a routine for determining the deterioration of the adsorbent 16, followed by termination of the routine. On the other hand, if the result of determination at step 31 is YES, it is determined whether or not the engine water temperature TW is equal to or higher than its lower limit value TWTRSL (for example, 0° C.) and equal to or lower than its upper limit value TWTRSH (for example, 50° C.) (step 33). If the result of determination at step 33 is NO, i.e., when the engine water temperature TW is out of a predetermined range defined by the upper and lower limit values TWTRSL/TWTRSH, the ECU 25 sets the deterioration determination enable flag F_MCNDTRS to "0" (step 32) on the assumption that the conditions are not established for executing the routine for determining the deterioration of the adsorbent 16, followed by termination of the routine.

On the other hand, if the result of determination at step 33 is YES, indicating that the engine water temperature TW is within the predetermined range, the ECU 25 sets the deterioration determination enable flag F_MCNDTRS to "1" (step 34), and sets the sensor resistance value VRST outputted from the downstream humidity sensor 22 at that time as respective initial values for a maximum value VRST_MAX (step 35) and a preceding value VRST_PRE (step 36), respectively. Then, the routine proceeds to step 37, where the ECU 25 searches a deterioration determination threshold table (hereinafter called the "TRSDTV table") shown in FIG. 9 to calculate the relative humidity TRSDTV, followed by termination of the routine.

The TRSDTV table shown in FIG. 9 corresponds to the TRSDT table shown in FIG. 5 in the first embodiment. Therefore, in the TRSDTV table, the deterioration determination threshold value TRSDTV for the adsorbent 16 is likewise set in accordance with the engine water temperature TW in the following manner. The deterioration determination threshold TRSDTV is set at a first predetermined value trsdtv1 when the engine water temperature TW is below a first predetermined temperature tw1 (for example, 0° C.), and at a second predetermined value trsdtv2 (trsdtv1>trsdtv2) when the engine water temperature TW exceeds a second predetermined temperature tw2 (for example 40° C.). Also, when the engine water temperature TW is between the two predetermined temperatures tw1, tw2 (tw1≦=TW≦=tw2), the deterioration determination threshold TRSDTV is set at a larger value as the engine water temperature TW is lower.

Figure 10:
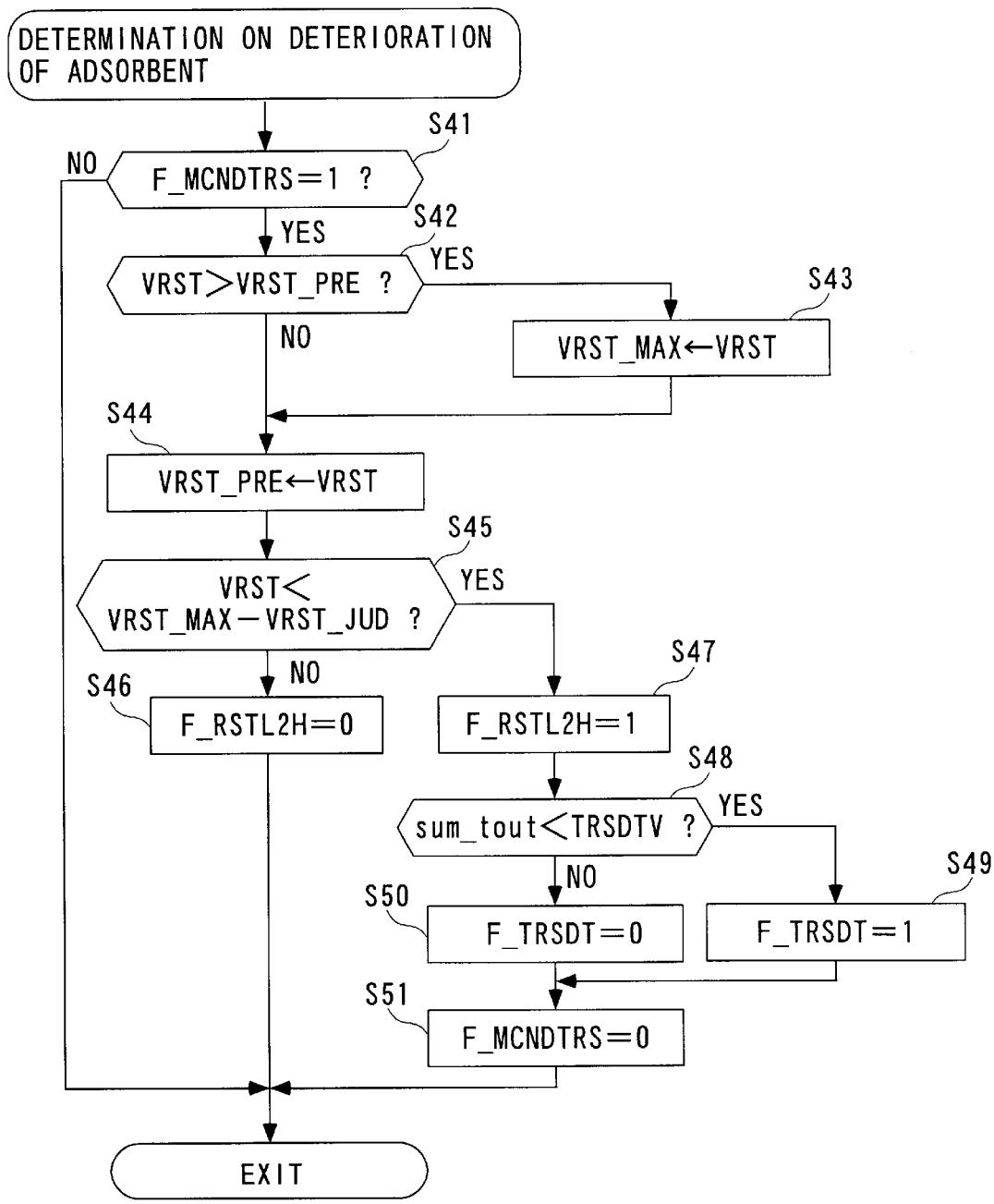
FIG. 10 is a flow chart illustrating a routine for determining the deterioration of the adsorbent based on a sensor resistance value VRST.
Figure 11:
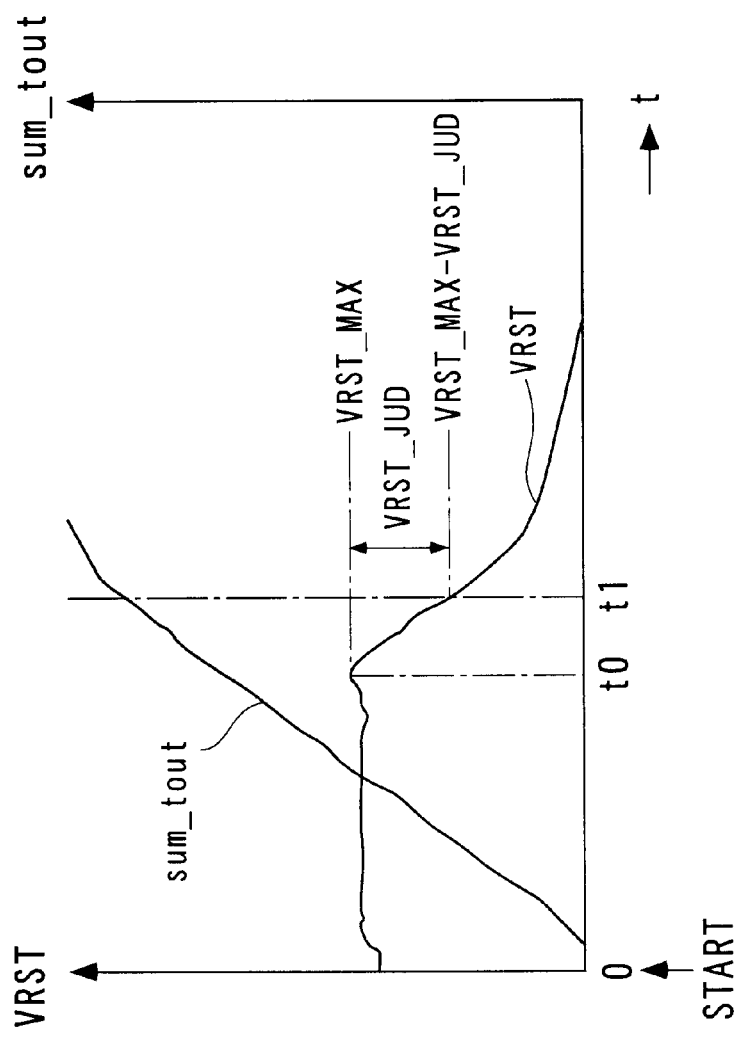
FIG. 11 is a time chart showing an exemplary transition of the sensor resistance value VRST which is a detection value of a downstream humidity sensor, and the accumulated fuel injection amount sum_tout from the start of the engine.

FIG. 10 illustrates a routine for determining a deterioration of the adsorbent 16 based on the sensor resistance value VRST of the downstream humidity sensor 22, which is executed in accordance with the result of the determination provided by the routine illustrated in FIG. 8. The routine in FIG. 10 corresponds to the routine illustrated in FIG. 6 in the first embodiment. In this routine, it is first determined whether or not the deterioration determination enable flag F_MCNDTRS is "1" (step 41). If the result of determination at step 41 is NO, i.e., when the conditions are not established for executing the deterioration determination, this routine is terminated without further processing. On the other hand, if the result of determination at step 41 is YES, i.e., when the conditions are established for executing the deterioration determination, it is determined whether or not the sensor resistance value VRST detected by the downstream humidity sensor 22 at the current time is larger than the preceding value VRST_PRE (step 42).

If the result of determination at step 42 is YES, i.e., VRST<VRST_PRE, the ECU 25 sets the sensor resistance value VRST at that time as a maximum value VRST_MAX (step 43). In this manner, the maximum value VRST_MAX is updated at all times when the sensor resistance value VRST is higher than the preceding value thereof, so that the maximum value VRST_MAX indicates a maximum value immediately before sensor resistance value VRST detected by the downstream humidity sensor 22 begins rising (see time t0 in FIG. 11). If the result of determination at step 42 is NO, or after executing step 43, the routine proceeds to step 44, where the ECU 25 shifts the current sensor resistance value VRST to the preceding value VRST_PRE.

Next, it is determined whether or not the sensor resistance value VRST is smaller than the sum of the maximum value VRST_MAX and a predetermined fall determination value VRST_JUD (for example, 30% of VRST_MAX) (step 45). If the result of determination at step 45 is NO, the ECU 25 sets a fall establishment flag F_RSTL2H to "0" (step 46), on the assumption that the sensor resistance value VRST has not sufficiently fallen, followed by termination of the routine.

On the other hand, if the result of determination at step 45 is YES, showing that VRST>VRST_MAX−VRST_JUD is established, i.e., when the sensor resistance value VRST falls from the maximum value VRST_MAX by the falling determination value VRST_JUD or more (at time t1 in FIG. 11), the ECU 25 sets the fall establishment flag F_RSTL2H to "1" (step 47), on the assumption that the sensor resistance value VRST has sufficiently fallen and is now stably falling.

Next, the routine proceeds to step 48, where it is determined whether or not an accumulated fuel injection amount sum_tout from the start of the engine 1 is smaller than the deterioration determination threshold TRSDTV calculated at the aforementioned step 37 in FIG. 8. If the determination result at step 48 is YES, i.e., when sum_tout<TRSDTV, the ECU 25 determines that the adsorbent 16 is deteriorated on the assumption that the sensor resistance value VRST has fallen earlier though the adsorbent 16 is not given sufficient calory to cause the sensor resistance value VRST to fall, and sets the deterioration flag F_TRSDT to "1" (step 49).

On the other hand, if the determination result at step 48 is NO, i.e., when sum_tout>TRSDT, the ECU 25 determines that the adsorbent 16 is not deteriorated on the assumption that the sensor resistance value VRST falls just after the adsorbent 16 is given sufficient calory, and sets the deterioration flag F_TRSDT to "0" (step 50). Then, at subsequent step 51, the ECU 25 sets a deterioration determination enable flag F_MCNDTRS to "0" in response to the termination of the deterioration determination for the adsorbent 16, followed by termination of the routine.

As described above in detail, according to the second embodiment, the deterioration determination can be accurately made for the adsorbent 16 in accordance with a temperature state of the exhaust system at the start and after the start of the engine 1, as is the case with the first embodiment.

Next, a third embodiment of the present invention will be described with reference to FIGS. 12 and 13. In the third embodiment, the deterioration determination is made for the adsorbent 16 using the upstream humidity sensor 30 after the engine 1 is stopped. It should be noted that the relative humidity VHUMD detected by the upstream humidity sensor 30 is compensated for temperature based on the ambient temperature THCM2 detected by the ambient temperature sensor 31 in a manner similar to the foregoing embodiments.

Figure 12:
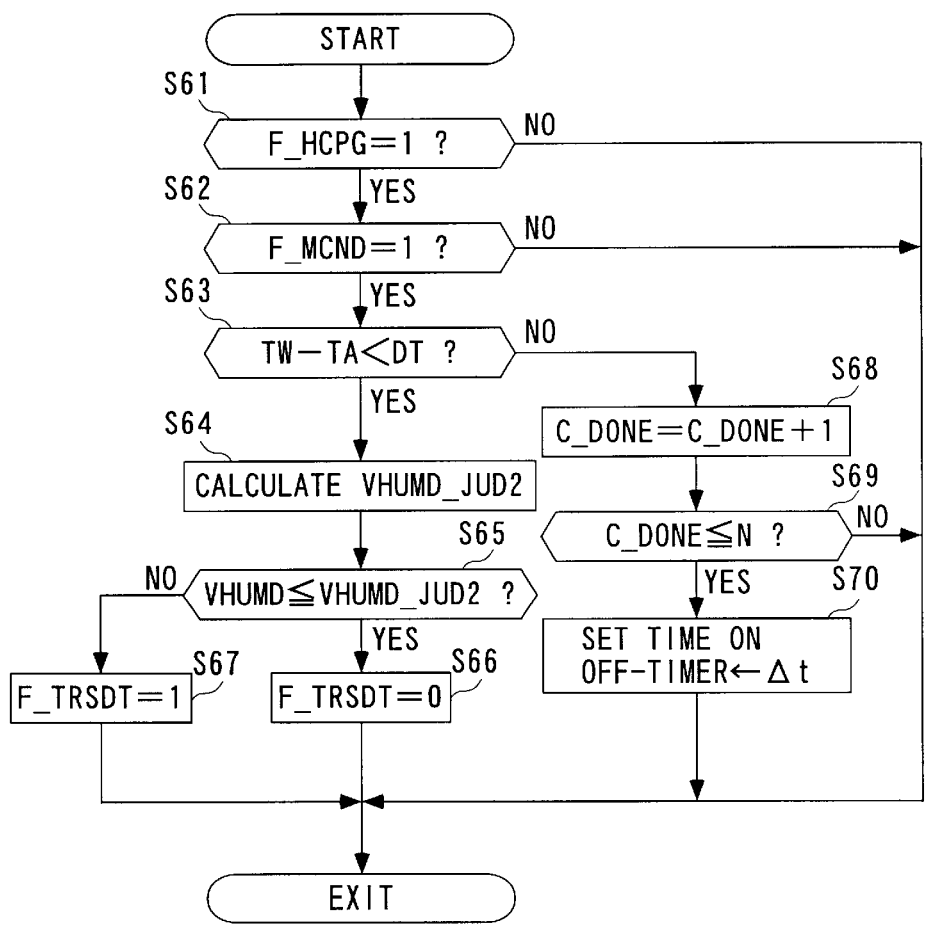
FIG. 12 is a flow chart illustrating a routine for determining the deterioration of the adsorbent, which is executed after the engine is stopped.

FIG. 12 is a flow chart illustrating a routine for determining a deterioration of the adsorbent 16, which is executed after the engine 1 is stopped. The deterioration determination is made based on the aforementioned policies. Specifically, the adsorbent 16 incrementally adsorbs moisture as the heated adsorbent 16 is gradually cooled down after the engine 1 is stopped. The adsorbent 16 is determined in regard to deterioration based on the humidity around the adsorbent 16 (hereinafter simply called the "ambient humidity") within the bypass passage 14 which remains substantially at a constant value when the adsorbent 16 is saturated.

Figure 13:
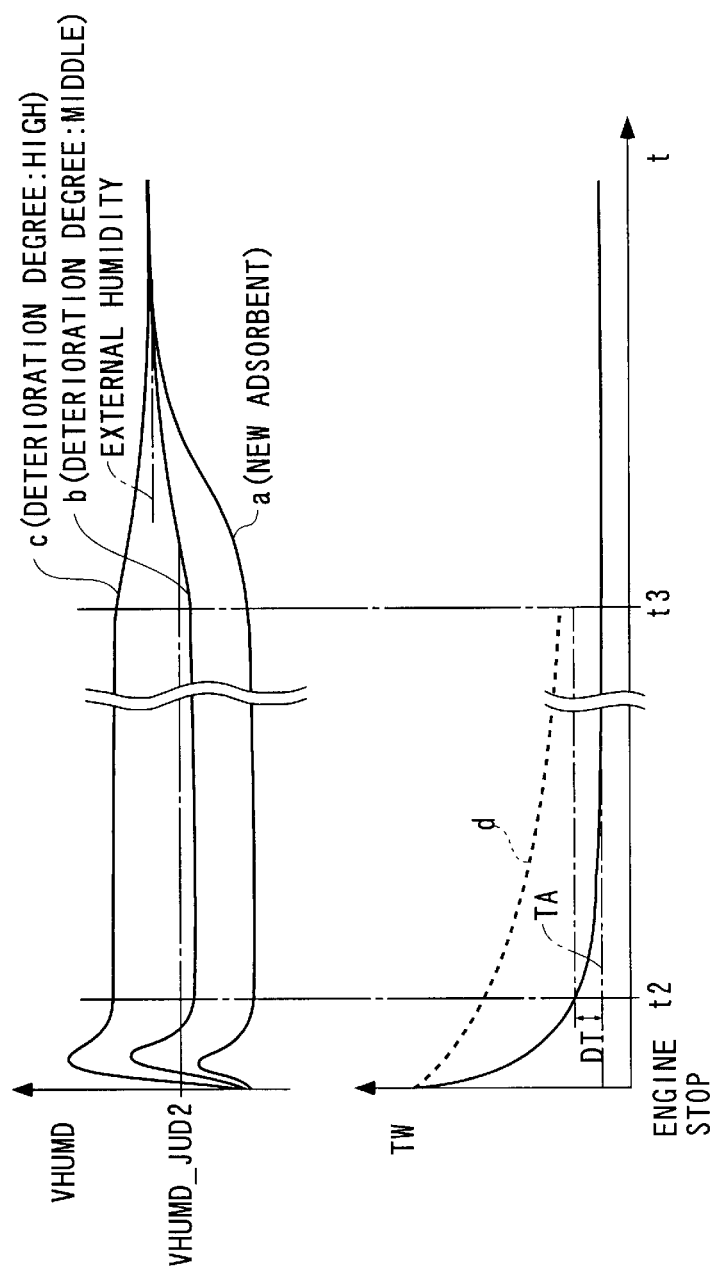
FIG. 13 is a time chart showing an exemplary transition of an ambient humidity detected by an upstream humidity sensor after the engine is stopped (in an upper portion), and a time chart showing an exemplary transition of an engine water temperature after the engine is stopped (in a lower portion).

The deterioration determination is made specifically when the ECU 25 is re-started by an off-timer which has been set a predetermined time (for example, two hours) after the lapse of the predetermined time after the engine 1 is stopped (time t2 in FIG. 13). The adsorbent 16 is determined in regard to deterioration based on the ambient humidity VHUMD which is the relative humidity detected by the upstream humidity sensor 30. As illustrated in FIG. 12, it is first determined at step 61 whether or not the desorption completion flag F_HCPG is "1." If the result of determination at step 61 is NO, i.e., when desorption is not completed during the preceding operation, this routine is terminated without further processing because hydrocarbons remaining in the adsorbent 16 could prevent a proper determination on the deterioration of the adsorbent 16.

On the other hand, if the result of determination at step 61 is YES, indicating that hydrocarbons have been desorbed during the preceding operation, it is determined whether or not the deterioration determination enable flag F_MCND is "1" (step 62). The deterioration determination enable flag F_MCND is set to "1" on the assumption that the adsorbent 16 can be properly determined in regard to deterioration when the engine water temperature TW is higher than a predetermined value (for example, 85° C.), i.e., the adsorbent 16 has been heated to a temperature at which adsorbed hydrocarbons can be desorbed therefrom, and an air/fuel mixture supplied to the engine 1 has remained within a predetermined range near the stoichiometric air/fuel ratio for a predetermined time or more during an operation of the engine 1. Therefore, if the result of determination at step 62 is NO, i.e., when F_MCND=0, this routine is terminated without further processing because no proper deterioration determination can be made for the adsorbent 16.

If the result of determination at step 62 is YES, i.e., when F_MCND=1, it is determined whether the difference between the engine water temperature TW and ambient temperature TA is larger than a predetermined value DT (step 63). If the result of determination at step 63 is YES, i.e., when TW−TA<DT (at time t2 in FIG. 13), the ECU 25 calculates a determination value VHUMD_JUD2 for determining a deterioration of the adsorbent 16 by searching a table, not shown, in accordance with the engine water temperature TW on the assumption that the engine water temperature TW has been cooled down to a temperature substantially equal to the ambient temperature TA, i.e., the adsorbent 16 has been cooled down to a temperature substantially equal to the ambient temperature TA, and the ambient humidity VHUMD remains substantially constant, i.e., in the steady-state (step 64). The determination value VHUMD_JUD2 is set at a smaller value as the engine after temperature TW is lower.

At next step 65, it is determined whether or not the ambient humidity VHUMD is equal to or lower than the determination value VHUMD_JUD2. If the result of determination at step 65 is YES, i.e., when VHUMD≦VHUMD_JUD2 (for example, curves a, b in FIG. 13), the ECU 25 determines that the adsorbent 16 still has a high moisture adsorbing performance and therefore is not deteriorated, and sets the deterioration flag F_TRSDT to "0" to indicate to that effect (step 66), followed by termination of the routine.

On the other hand, if the result of determination at step 65 is NO, i.e., when VHUMD>VHUMD_JUD2 (for example, a curve c in FIG. 13), the ECU 25 determines that the adsorbent 16 has a low moisture adsorbing performance and therefore is deteriorated, and sets the deterioration flag F_TRSDT to "1" (step 67), followed by termination of the routine.

If the result of determination at step 63 is NO, indicating that TW−TA≧DT, i.e., when the adsorbent 16 has not been cooled down to a temperature substantially equal to the ambient temperature TA, the ECU 25 increments a counter C_DONE indicative of the number of times the deterioration determination has been made (step 68), on the assumption that the ambient humidity VHUMD is not in the steady-state, and it is determined whether or not the value indicated by the counter C_DONE is equal to or less than an upper limit value N (step 69). The counter C_DONE is initialized to "0" when the operation of the engine 1 is stopped.

If the result of determination at step 69 is YES, i.e., when C_DONE≦N, the ECU 25 set again the time on the off-timer used to re-start the ECU 25 after the predetermined time from the stop of the engine 1 to an additional time Δt (for example, 30 minutes) shorter than the predetermined time (step 70), followed by termination of the routine. In this manner, the deterioration determination is once interrupted, and resumed after the lapse of the additional time Δt when the ECU 25 is restarted. During the interruption, the value on the counter C_DONE is maintained. Then, if the result of determination at step 63 changes to YES in the resumed deterioration determination, steps 64 onward are accordingly executed.

On the other hand, if the result of determination at step 63 still NO even after the resumed deterioration determination, and if the result of determination at step 69 is also NO, i.e., when the engine water temperature TW does not converge to the ambient temperature TA even after the lapse of the sum (predetermined time) of the predetermined time originally set on the off-timer and a time corresponding to the upper limit value N (=N×Δt) after the stop of the engine 1 (at time t3 in FIG. 13), as indicated by a broken line d in FIG. 13, this routine is terminated on the assumption that no proper deterioration determination can be made for the adsorbent 16. The upper limit value N and time t3 are set based on predetermined experiments and the like, and the time t3 is set, for example, to 24–72 hours.

As described above, the deterioration determination for the adsorbent 16 in the third embodiment is made during a period in which the ambient humidity VHUMD detected by the upstream humidity sensor 30 is in the steady-state after the engine 1 is stopped (between times t2–t3 in FIG. 13). Therefore, the deterioration determination can be appropriately and accurately made for the adsorbent 16, as described above. In addition, since the deterioration determination only requires the detection of the ambient humidity in the steady-state, a humidity sensor for detecting the ambient humidity is not required to have a high responsibility, so that a reasonable humidity sensor can be used, thereby reducing the cost of the overall apparatus.

Also, the deterioration determination is made on the condition that the engine 1 had been operated near the stoichiometric air/fuel ratio before it was stopped. Generally, when the engine 1 is operated near the stoichiometric air/fuel ratio, exhaust gases contain a relatively large amount of moisture without large variations, so that the ambient humidity VHUMD immediately after the engine 1 is stopped is also relatively high without large variations, suitable for performing the deterioration determination for the adsorbent 16. Thus, the deterioration determination made in such a condition can provide a more accurate determination as to whether the adsorbent 16 is deteriorated.

It should be understood that the present invention is not limited to the aforementioned embodiments, but may be practiced in a variety of forms. For example, while the embodiments employ the relative humidity VHUMD and sensor resistance value VRST as parameters indicative of the humidity of exhaust gases, any other appropriate parameter may be employed instead. Also, in the aforementioned embodiments, the temperature state in the exhaust system 2 is represented by the engine water temperature TW detected by the engine water temperature 23, and the ambient temperature THCM around the downstream humidity sensor 22 is directly detected by the ambient temperature sensor 21. Alternatively, they may be estimated based on a detection value of the downstream humidity sensor 22.

Further, in the third embodiment, the upstream humidity sensor 30 is used in order to prevent disturbance such as a gas exchange between the surroundings of the bypass passage 14 and external air when the ambient humidity VHUMD is detected after the engine 1 is stopped. Alternatively, the downstream humidity sensor 22 may be used to detect the ambient humidity. Otherwise, details in configuration can be modified as appropriate without departing from the scope of the invention as defined in the appended claims.

As described above in detail, the state determining apparatus for an exhaust gas purifier can advantageously determine, with a high accuracy, the state of the exhaust gas purifier including an adsorbent for adsorbing hydrocarbons, including a deterioration of the adsorbent, in accordance with a temperature state of an exhaust system in an internal combustion engine.

What is claimed is:

1. A state determining apparatus for an exhaust gas purifier arranged in an exhaust system of an internal combustion engine for determining a state of said exhaust gas purifier including an adsorbent capable of adsorbing hydrocarbons and moisture in exhaust gases, said state determining apparatus comprising:

a humidity sensor arranged near said adsorbent in said exhaust system for detecting a humidity in an exhaust pipe of said exhaust system;

temperature state detecting means for detecting a temperature state in said exhaust system; and adsorbent state determining means for determining a state of said adsorbent in accordance with the humidity in the exhaust pipe detected by said humidity sensor and the temperature state in said exhaust system detected by said temperature state detecting means.

2. A state determining apparatus for an exhaust gas purifier according to claim 1, further comprising:

calory calculating means for calculating calory supplied from said internal combustion engine to said exhaust system after said internal combustion engine is started, wherein said adsorbent state determining means further determines the state of said adsorbent further in accordance with the calory calculated by said calory calculating means.

3. A state determining apparatus for an exhaust gas purifier according to claim 2, further comprising:

threshold determining means for determining a threshold based on the temperature state in said exhaust system detected at the time said internal combustion engine is started, wherein said calory calculating means includes accumulated fuel injection amount calculating means for calculating an accumulated fuel amount supplied to said internal combustion engine from a start thereof as said calory, and said adsorbent state determining means determines the state of said adsorbent based on a result of comparison between the accumulated fuel amount from the start of said internal combustion engine and the threshold when a changing amount of the value detected by said humidity sensor after said internal combustion engine is started exceeds a predetermined value set therefor.

4. A state determining apparatus for an exhaust gas purifier according to claim 1, further comprising:

ambient temperature detecting means for detecting an ambient temperature around said humidity sensor; and relative humidity calculating means for calculating a relative humidity of exhaust gases from an output of said humidity sensor in accordance with the detected ambient temperature.

5. A state determining apparatus for an exhaust gas purifier according to claim 1, wherein said humidity sensor is arranged at a location downstream of said adsorbent in said exhaust system.

6. A state determining apparatus for an exhaust gas purifier according to claim 1, wherein said adsorbent state determining means determines the state of said adsorbent after a stop of said internal combustion engine.

7. A state determining apparatus for an exhaust gas purifier according to claim 6, wherein said adsorbent state determining means determines the state of said adsorbent within a predetermined period after said internal combustion engine is stopped.

8. A state determining apparatus for an exhaust gas purifier according to claim 6, wherein said humidity sensor is arranged at a location upstream of said adsorbent in said exhaust system.

9. A state determining apparatus for an exhaust gas purifier according to claim 6, further comprising:

operating condition detecting means for detecting whether or not said internal combustion engine is operated in a predetermined operating condition before said internal combustion engine is stopped, wherein said adsorbent state determining means determines the state of said adsorbent when said operating condition detecting means detects that said internal combustion engine is operated in said predetermined operating condition before said internal combustion engine is stopped.

10. A state determining apparatus for an exhaust gas purifier according to claim 9, wherein said predetermined operating condition of said internal combustion engine is a condition in which an air/fuel mixture supplied to said internal combustion engine is at an air/fuel ratio near the stoichiometric air/fuel ratio during the operation of said internal combustion engine.

11. A state determining apparatus for an exhaust gas purifier according to claim 1, wherein said temperature state of said exhaust system is a temperature of a cooling water upon start of said internal combustion engine.

12. A state determining apparatus for an exhaust gas purifier according to claim 1, wherein said adsorbent state determining means includes adsorbent deterioration determining means for determining a deterioration of said adsorbent as the state of said adsorbent.

13. A state determining apparatus for an exhaust gas purifier according to claim 1, wherein said adsorbent comprises zeolite.

* * * * *